US 8,077,698 B2

(12) United States Patent
Beer-Gingold et al.

(10) Patent No.: US 8,077,698 B2
(45) Date of Patent: Dec. 13, 2011

(54) METHOD AND DEVICE FOR FRAME AND SLOT SYNCHRONIZATION

(75) Inventors: Shlomo Beer-Gingold, Guivat Shmuel (IL); Alexander Sverdlov, Hod Hasharon (IL); Michael Zarubinsky, Rishon Lezion (IL)

(73) Assignee: Freescale Semiconductor, Inc., Austin, TX (US)

( * ) Notice: Subject to any disclaimer, the term of this patent is extended or adjusted under 35 U.S.C. 154(b) by 539 days.

(21) Appl. No.: 12/331,835

(22) Filed: Dec. 10, 2008

(65) Prior Publication Data

US 2010/0142511 A1    Jun. 10, 2010

(51) Int. Cl.
*H04J 3/06*    (2006.01)
(52) U.S. Cl. ........................................ 370/350; 370/513
(58) Field of Classification Search ................... 370/342, 370/350, 512, 513
See application file for complete search history.

(56) References Cited

U.S. PATENT DOCUMENTS

| 7,386,006 | B2 * | 6/2008 | Rimi et al. | 370/464 |
| 2004/0196893 | A1 * | 10/2004 | Oh et al. | 375/148 |
| 2009/0312008 | A1 * | 12/2009 | Lindoff et al. | 455/423 |
| 2010/0069106 | A1 * | 3/2010 | Swarts et al. | 455/502 |

* cited by examiner

*Primary Examiner* — Melvin Marcelo

(57) ABSTRACT

A method slot and frame synchronization of in a wireless system, the method includes: processing samples and a pair of primary synchronization code forming sequences by a pair of serially coupled filters to provide primary results; finding, in response to the primary results, slots boundaries; processing selected samples and multiple pairs of secondary synchronization code forming sequences by at least a second filter of the pair of serially coupled filters to provide secondary results; wherein the selected samples correspond to the slots boundaries; and detecting secondary synchronization sequences included in a frame in response to the secondary results.

15 Claims, 4 Drawing Sheets

METHOD AND DEVICE FOR FRAME AND SLOT SYNCHRONIZATION

FIELD OF THE INVENTION

This disclosure relates generally to methods and devices for frame and slot synchronization.

BACKGROUND OF THE INVENTION

Wideband code division multiple access (WDCMA) networks transmit information in frames. Each frame includes multiple slots and each slot includes multiple chips. Each slot starts by a primary synchronization code (PSC) and a secondary synchronization code (SSC). The PSC is the same for each slot of the frame while the SSC is used to encode a code group number and can differ from one slot to another. A frame can include fifteen slots, each slot can include 2560 chips and each of the PSC and SSC can include 256 chips.

In WCDMA mobile devices, cell search (search for available base stations) can be performed in three scenarios: initial cell search that occurs when a mobile device is switched on, idle mode search that occurs when the mobile device is inactive, and active mode search during a call.

The cell search is characterized by a high computational load and multiple memory accesses. It requires a dedicated slot synchronizer and a dedicated frame synchronizer, each consuming a substantial amount of power and spanning over a substantial integrated circuit real estate.

A Slot synchronizer includes a dedicated matched filter that is applied to the input data to detect slot boundaries. The filter impulse response matches the primary synchronization code (PSC). After accumulation among several slots (groups of chips) and sorting, a number of candidates are identified as possible slot boundary candidates.

A frame synchronizer includes a correlating circuit that evaluates all possible SSCs by correlating them with input data that represents the received SSCs for all found slot boundaries. The correlation results are used for decoding the SSC group number.

SUMMARY OF THE PRESENT INVENTION

The present invention provides a method and a device as described in the accompanying claims. Specific embodiments of the invention are set forth in the dependent claims. These and other aspects of the invention will be apparent from and elucidated with reference to the embodiments described hereinafter.

BRIEF DESCRIPTION OF THE DRAWINGS

Further details, aspects, and embodiments of the invention will be described, by way of example only, with reference to the drawings.

DETAILED DESCRIPTION OF THE DRAWINGS

In the following specification, the invention will be described with reference to specific examples of embodiments of the invention. It will, however, be evident that various modifications and changes may be made therein without departing from the broader spirit and scope of the invention as set forth in the appended claims.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

It has been found that integrated circuit real estate can be reduced by utilizing the same pair of serially coupled filters to participate in both frame synchronization and slot synchronization.

By re-using, during the frame synchronization phase and the slot synchronization phase, samples stored in a buffer connected to a first filter (of the pair of serially connected filters) the amount of memory accesses is reduced. Furthermore, the samples are sent to the buffer by a high frequency module such as a radio frequency receiver. By storing the samples in the buffer and then re-using it the duration during which the high frequency module should be active can be reduced. This can assist in reducing the power consumption of the device. Thus, the high frequency module can be set to a low power mode after filling the buffer.

Samples can be obtained at a sample rate that equals a chip rate, or at a rate that exceeds a chip rate. For example, a sample rate that is twice or even four times the chip rate can be used. Higher sample rate can result in more samples per slot or frame thus more filtering operations can be performed.

The re-use of input data can reduce the number of memory accesses, especially if the same samples are used to generate multiple primary and secondary results. For example, a single sample can be retrieved and used to provide at least fifteen secondary results.

The reduction of memory accesses also contributed to the power consumption reduction. Accordingly, the same battery can be used for a longer period or a smaller battery can be used.

The slot synchronization and even the frame synchronization can be executed at a rate that exceeds the sample rate (the rate of receiving the samples) thus allowing to use the pair of serially connected filters for slot synchronization and then (in a sequential manner) for frame synchronization.

Figure 1:
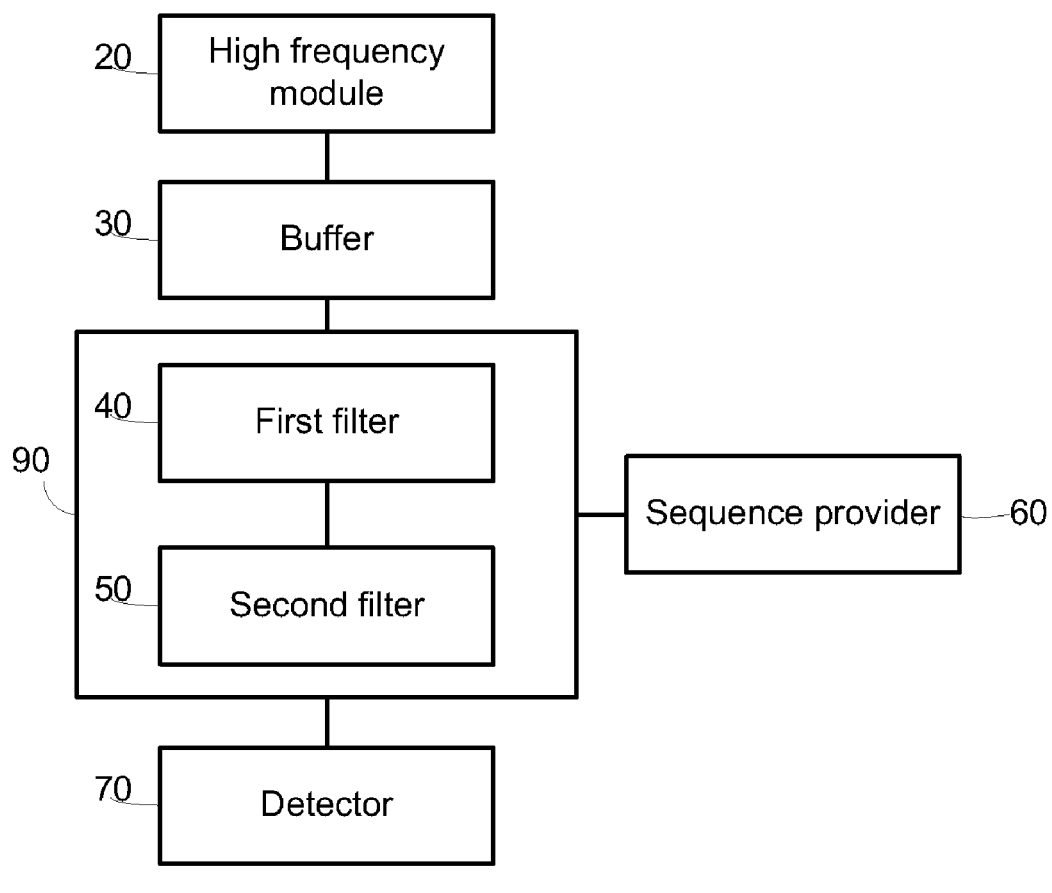
FIG. 1 schematically shows an example of an embodiment of a device.

FIG. 1 schematically shows an example of an embodiment of device 10 having slot and frame synchronization capabilities. Device 10 includes high frequency module 20, buffer 30, first filter 40, second filter 50, sequence provider 60, detector 70 and controller (not illustrated).

Device 10 can be a mobile communication device or a part of a stationary base station. It can include one or more integrated circuits. It can include multiple components that are not shown for simplicity of explanation.

First and second filters 40 and 50 form a pair 90 of serially connected filters. These filters are connected in a serial manner in the sense that filtered information from the first filter 40 is the input to second filter 50.

High frequency module 20 can be a radio frequency receiver and it provides samples to buffer 30. Buffer 30 is connected to first filter 40 that is connected to second filter 50 and to sequence provider 60. Second filter 50 is connected to sequence provider 60 and to detector 70. The controller can be connected to various components out of the mentioned above components and can control their operation.

Buffer 30 is adapted to store samples. It can store at least one group of samples at a time. Buffer 30 stores samples that can be used during frame and slot synchronization.

Pair 90 of serially connected filters is utilized during frame synchronization and slot synchronization. Pair 90 can process samples and a pair of primary synchronization code forming sequences to provide primary results as well as process selected samples and multiple pairs of secondary synchronization code forming sequences to provide secondary results. The selected samples correspond to the slots boundaries.

During slot synchronization detector 70 finds slots boundaries in response to the primary results. During frame synchronization detector 70 identifies which secondary synchronizations sequences out of multiple possible (allowable) SSCs were transmitted. The transmitted SSCs form one out of multiple predefined SSCs series. The identity of the SSC series can assist in determining which base station transmitted the frame.

High frequency module 20 fills buffer 30 with samples. High frequency module 20 can enter a low power mode after filling buffer 30. First filter 40 can retrieve samples from buffer 30 and both first and second filters 40 and 50 can process the samples while high frequency module 20 is in the low power mode. High frequency module 20 can enter a low power mode after partially filling buffer 30 or after entirely filling buffer 30.

First and second filters 40 and 50 can operate at a first rate that exceeds a sample rate. The sample rate is the rate in which samples are transmitted or received. The first rate can be higher and even much higher then the sample rate. It can be determined by the frequency of the clock signal provided to these filters.

First and second filters 40 and 50 can process one group of samples after the others. During filtering iterations of first filter 40, multiple samples of the same sub-group of samples are multiplied by the same element of a primary synchronization code sequence.

The primary synchronization code (PSC) can be generated by a position wise multiplication of two primary synchronization code forming sequences denoted P and Q.

$P=<1,1,1,1,1,1,-1,-1,1,-1,1,-1,1,-1,-1,1,>=<p_1, \ldots, p_{16}>$, wherein $Q=<1,1,1,-1,-1,1,-1,1,1,1,-1,1,-1,1,1,>=<q_1, \ldots q_{16}>$. PSC is 256 bit long and include sixteen sequences of either P or P−, it equals P*Q: <P,P,P,−P,−P,P,−P,P,P,−P,P,−P,P,P>.

During slot synchronization, first filter 40 multiples samples by P while second filter 50 multiplies first filter primary results by a second primary synchronization code forming sequence.

First filter 40 multiplies samples by elements of Q and accumulates intermediate results obtained during multiple filtering iterations to provide first filter primary results.

Second filter 50 multiples first filter primary results by elements of P and accumulates intermediate results obtained during multiple filtering iterations to provide second filter primary results. After multiple filtering iterations second filter can output primary results.

Each secondary synchronization code can be generated by a position wide of two secondary synchronization sequences, wherein one of these sequences is denoted B and the other sequence is reflects a Hadamard sequence that can change from SSC to another.

The first secondary synchronization sequence is denoted B. Its elements are referred to as $B_1., ,, B_{16}$.

The second secondary synchronization sequence is denoted K and is generated by multiplying a fixed sequence (denoted Z) with a Hadamard sequence (H).

Fixed sequence Z can be generated by repetitions of a B and an inverted sequence (−B): $B=<1,1,1,1,1,1,1,1,-1,1,-1,1,-1,1,-1>$; and $z=<B, B, B, -B, B, B, -B, -B, B, -B, -B, -B, -B, -B, -B>$.

Samples can be processed in groups. Each group can include multiple sub-groups. The length of the group is set in response to the length of the primary and/or secondary synchronization code. For example, it can equal the length of the primary synchronization code.

The length of each sub-group can be determined based upon the length of the group, computational capabilities of each of the first and second filters, the sample rate and the filter rate.

A group should include an integer number of sub-groups. Higher filter rate (which is the operational rate of the filter) in relation to the sample rate can enable a processing of fewer samples at a time. The computational capability of the filter can de derived from the number of multipliers and/or buffers per filter wherein more computational capability facilitates more computations in parallel. For example, assuming that first filter 40 includes eight accumulators then each sub-group should include eight samples. A group of 256 samples includes sixteen sub-groups of samples.

First filter 40 performs two pairs of sixteen filtering iterations, during each filtering operation a position wise multiplication of a sub group of eight samples and eight elements of Q to provide eight intermediate results. During each of these sixteen filtering iterations the intermediate result is sent to an accumulator out of eight accumulators (A1-A8 401-408) of first filter 40.

During each sixteen filtering iterations each accumulator adds an intermediate result with one or more previous intermediate results so that the j'th accumulator (j being an index that in this example ranges between 1 and 8) accumulates intermediate results obtained from multiplying the j'th sample of each sub-group with an element of Q.

For example, during a first filtering iteration, first filter 40 obtains (from buffer 30) a first sub-group of samples that includes $c_1$-$c_8$, performs the following multiplications: $c_1*q_1, c_2*q_1, c_3*q_1, c_4*q_1, c_5*q_1, c_6*q_1, c_7*q_1$ and $c_8*q_1$. The first intermediate result (outcome of $c_1*q_1$) is sent to first accumulator A1 401, the second intermediate result (outcome of $c_2*q_1$) is sent to second accumulator A2 402, the third intermediate result (outcome of $c_3*q_1$) is sent to third accumulator A3 403, the fourth intermediate result (outcome of $c_4*q_1$) is sent to fourth accumulator A1 404, the fifth intermediate result (outcome of $c_5*q_1$) is sent to fifth accumulator A5 405, the sixth intermediate result (outcome of $c_6*q_1$) is sent to sixth accumulator A6 406, the seventh intermediate result (outcome of $c_7*q_1$) is sent to seventh accumulator A7 407, and the eighth intermediate result (outcome of $c_8*q_1$) is sent to eighth accumulator A8 408.

During a second filtering iteration first filter 40 obtains another sub-group of samples (for example—$c_{17}$-$c_{24}$) and performs substantially the same multiplication operation. Intermediate results obtained during the second filtering iteration are sent to first till eighth accumulators A1-A8 401-408 to be added to the previously calculated intermediate results. For example, at the end of this second filtering iteration first accumulator A1 401 stores the sum of ($c_1*q_1$) and ($c_{17}*q_2$).

Table 1 illustrates few filtering iterations and the content of some accumulators. Overall, first filter 40 performs two pairs of sixteen filtering iterations. After the first sixteen filtering iterations the content of the accumulators is reset. FI indicates the serial number of the filtering iteration. SG is the serial number of the sub-group of fetched samples.

TABLE 1

| FI | SG | Multiplications | Current value of first accumulator | Current value of eighth accumulator |
|---|---|---|---|---|
| 1 | 1 | c1 * q1 ... c8 * q1 | A1(1) = c1 * q1 | A8(1) = c8 * q1 |
| 2 | 3 | c17 * q2 ... c24 * q2 | A1(2) = A1(1) + c17 * q2 | A8(2) = A8(1) + c24 * q2 |
| 3 | 5 | c33 * q3 ... c40 * q3 | A1(3) = A1(2) + c33 * q3 | A8(3) = A8(2) + c40 * q3 |
| 4 | 7 | c49 * q4 ... c56 * q4 | A1(4) = A1(3) + c49 * q4 | A8(4) = A8(3) + c56 * q4 |
| 5 | 9 | c65 * q5 ... c72 * q5 | A1(5) = A1(4) + c65 * q5 | A8(5) = A8(4) + c72 * q5 |
| 6 | 11 | c81 * q6 ... c88 * q6 | A1(6) = A1(5) + c81 * q6 | A8(6) = A8(5) + c88 * q6 |
| 7 | 13 | c97 * q7 ... c104 * q7 | A1(7) = A1(6) + c97 * q7 | A8(7) = A8(6) + c104 * q7 |
| 8 | 15 | c113 * q8 ... c120 * q8 | A1(8) = A1(7) + c113 * q8 | A8(8) = A8(7) + c120 * q8 |
| 9 | 17 | c129 * q9 ... c136 * q9 | A1(9) = A1(8) + c129 * q9 | A8(9) = A8(8) + c136 * q9 |
| 10 | 19 | c145 * q10 ... c152 * q10 | A1(10) = A1(9) + c145 * q10 | A8(10) = A8(9) + c152 * q10 |
| 11 | 21 | c161 * q11 ... c168 * q11 | A1(11) = A1(10) + c161 * q11 | A8(11) = A8(10) + c168 * q11 |
| 12 | 23 | c177 * q12 ... c184 * q12 | A1(12) = A1(11) + c177 * q12 | A8(12) = A8(11) + c184 * q12 |
| 13 | 25 | c193 * q13 ... c200 * q13 | A1(13) = A1(12) + c193 * q13 | A8(13) = A8(12) + c200 * q13 |
| 14 | 27 | c209 * q14 ... c216 * q14 | A1(14) = A1(13) + c209 * q14 | A8(14) = A8(13) + c216 * q14 |
| 15 | 29 | c225 * q15 ... c232 * q15 | A1(15) = A1(14) + c225 * q15 | A8(15) = A8(14) + c232 * q15 |
| 16 | 31 | c241 * q16 ... c248 * q16 | A1(16) = A1(15) + c241 * q16 | A8(16) = A8(15) + c248 * q16 |
| 17 | 2 | c9 * q1 ... c16 * q1 | A1(17) = c9 * q1 | A8(17) = c16 * q1 |
| 18 | 4 | c25 * q1 ... c32 * q2 | A1(18) = A1(17) + c25 * q2 | A8(18) = A8(17) + c32 * q2 |
| 19 | 6 | c41 * q1 ... c48 * q3 | A1(19) = A1(18) + c41 * q3 | A8(19) = A8(18) + c48 * q3 |
| 20 | 8 | c57 * q1 ... c64 * q4 | A1(20) = A1(19) + c57 * q4 | A8(20) = A8(19) + c64 * q4 |
| 21 | 10 | c73 * q1 ... c80 * q5 | A1(21) = A1(20) + c73 * q5 | A8(21) = A8(20) + c80 * q5 |
| 22 | 12 | c89 * q1 ... c96 * q6 | A1(22) = A1(21) + c89 * q6 | A8(22) = A8(21) + c96 * q6 |
| 23 | 14 | c105 * q1 ... c112 * q7 | A1(23) = A1(22) + c105 * q7 | A8(23) = A8(22) + c112 * q7 |
| 24 | 16 | c121 * q1 ... c128 * q8 | A1(24) = A1(23) + c121 * q8 | A8(24) = A8(23) + c128 * q8 |
| 25 | 18 | c137 * q1 ... c144 * q9 | A1(25) = A1(24) + c137 * q9 | A8(25) = A8(24) + c144 * q9 |
| 26 | 20 | c153 * q1 ... c160 * q10 | A1(26) = A1(25) + c153 * q10 | A8(26) = A8(25) + c160 * q10 |
| 27 | 22 | c169 * q1 ... c176 * q11 | A1(27) = A1(26) + c169 * q11 | A8(27) = A8(26) + c176 * q11 |
| 28 | 24 | c185 * q1 ... c192 * q12 | A1(28) = A1(27) + c185 * q12 | A8(28) = A8(27) + c192 * q12 |
| 29 | 26 | c201 * q1 ... c208 * q13 | A1(29) = A1(28) + c201 * q13 | A8(29) = A8(28) + c208 * q13 |
| 30 | 28 | c217 * q1 ... c224 * q14 | A1(30) = A1(29) + c217 * q14 | A8(30) = A8(29) + c224 * q14 |
| 31 | 30 | c233 * q1 ... c240 * q15 | A1(31) = A1(30) + c233 * q15 | A8(31) = A8(30) + c240 * q15 |
| 32 | 32 | c249 * q1 ... c256 * q16 | A1(32) = A1(31) + c249 * q16 | A8(32) = A8(31) + c256 * q16 |

After these filtering iterations of first filter 40 accumulators A1-A8 (401-409) store A1(32)-A8(32). These results are referred to as first filter primary results.

First and second filters 40 and 50 work in a pipelined manner. This can result in sending different intermediate results to different accumulators of the same filter at different points of time.

Second filter 50 can start filtering these first filter primary results. It multiplies each first filter primary result with elements of P to provide sixteen intermediate results during each filtering iterations. These intermediate results are then fed to sixteen accumulators (A'1-A'16 501-516) that accumulate these intermediate results with previously calculated intermediate results.

While A1(32) is multiplied by P, A2(32) is multiplied by a modified version of P that is cyclic shifted by one, A3(32) is multiplied by a modified version of P that is cyclic shifted by two, A4(32) is multiplied by a modified version of P that is cyclic shifted by three, A5(32) is multiplied by a modified version of P that is cyclic shifted by four, A6(32) is multiplied by a modified version of P that is cyclic shifted by five, A7(32) is multiplied by a modified version of P that is cyclic shifted by six, and A8(32) is multiplied by a modified version of P that is cyclic shifted by eight.

Accordingly, after eight iterations of second filter 50 accumulators A'1-A'16 (501-516) of second filter 50 store:

$$A'1(8)=A1(32)*P1+A2(32)*P2+A3(32)*P3+A4(32)*P4+A5(32)*P5+A6(32)*P6+A7(32)*P7+A8(32)*P8.$$

$$A'2(8)=A1(32)*P2+A2(32)*P3+A3(32)*P4+A4(32)*P5+A5(32)*P6+A6(32)*P7+A7(32)*P8+A8(32)*P1.$$

$$A'3(8)=A1(32)*P3+A2(32)*P4+A3(32)*P5+A4(32)*P6+A5(32)*P7+A6(32)*P8+A7(32)*P1+A8(32)*P2.$$

$$A'4(8)=A1(32)*P4+A2(32)*P5+A3(32)*P6+A4(32)*P7+A5(32)*P8+A6(32)*P1+A7(32)*P2+A8(32)*P3.$$

$$A'5(8)=A1(32)*P5+A2(32)*P6+A3(32)*P7+A4(32)*P8+A5(32)*P1+A6(32)*P2+A7(32)*P3+A8(32)*P4.$$

$$A'6(8)=A1(32)*P6+A2(32)*P7+A3(32)*P8+A4(32)*P1+A1(32)*P2+A6(32)*P3+A7(32)*P4+A8(32)*P5.$$

$$A'7(8)=A1(32)*P7+A2(32)*P8+A3(32)*P1+A4(32)*P2+A5(32)*P3+A6(32)*P4+A7(32)*P5+A8(32)*P6.$$

$$A'8(8)=A1(32)*P8+A2(32)*P1+A3(32)*P2+A4(32)*P3+A5(32)*P4+A6(32)*P5+A7(32)*P6+A8(32)*P7.$$

Due to the pipelined manner in which filters 40 and 50 operate, accumulators A'1-A'16 receive the intermediate results (Ar(32)*Pj) at different point in time, hence implementing a sliding window that passes over the first phase intermediate results.

Assuming that the group of samples is the first group that is being processed then table 2 illustrates the content of A'1-A'16 501-516.

TABLE 2

| I | A'1 | A'2 | A'3 | A'4 | A'5 | A'6 | A'7 | A'8 |
|---|---|---|---|---|---|---|---|---|
| 1 | A'1(1) | INIT | INIT | INIT | INIT | INIT | INIT | INIT |
| 2 | A'1(2) | A'2(1) | INIT | INIT | INIT | INIT | INIT | INIT |
| 3 | A'1(3) | A'2(2) | A'3(1) | INIT | INIT | INIT | INIT | INIT |
| 4 | A'1(4) | A'2(3) | A'3(2) | A'4(1) | INIT | INIT | INIT | INIT |
| 5 | A'1(5) | A'2(4) | A'3(3) | A'4(2) | A'5(1) | INIT | INIT | INIT |
| 6 | A'1(6) | A'2(5) | A'3(4) | A'4(3) | A'5(2) | A'6(1) | INIT | INIT |
| 7 | A'1(7) | A'2(6) | A'3(5) | A'4(4) | A'5(3) | A'6(2) | A'7(1) | INIT |
| 8 | A'1(8) | A'2(7) | A'3(6) | A'4(5) | A'5(4) | A'6(3) | A'7(2) | A'8(1) |
| 9 |  | A'2(8) | A'3(7) | A'4(6) | A'5(5) | A'6(4) | A'7(3) | A'8(2) |
| 10 |  |  | A'3(8) | A'4(7) | A'5(6) | A'6(5) | A'7(4) | A'8(3) |
| 11 |  |  |  | A'4(8) | A'5(7) | A'6(6) | A'7(5) | A'8(4) |
| 12 |  |  |  |  | A'5(8) | A'6(7) | A'7(6) | A'8(5) |
| 13 |  |  |  |  |  | A'6(8) | A'7(7) | A'8(6) |
| 14 |  |  |  |  |  |  | A'7(8) | A'8(7) |
| 15 |  |  |  |  |  |  |  | A'8(8) |

Wherein A's(t) is the value of the s'th accumulator of second filter 50 after the t'th iteration.

It is noted that the mentioned above iterations result in multiplying a group of 256 samples (c1-c256) by two primary synchronization code forming sequences (P and Q).

The slot synchronization requires that all (or almost all—if we take into account edge conditions at the beginning and end of the frame) samples of a frame will be multiplied by PSC. This can be achieved by repeating the mentioned above iterations on other samples of the frame. For example, during the next iterations another group of samples (c2-c256) can be multiplied by two primary synchronization code forming sequences (P and Q). The other group of samples can include one or more sample from another frame or can end by c1.

Figure 2:
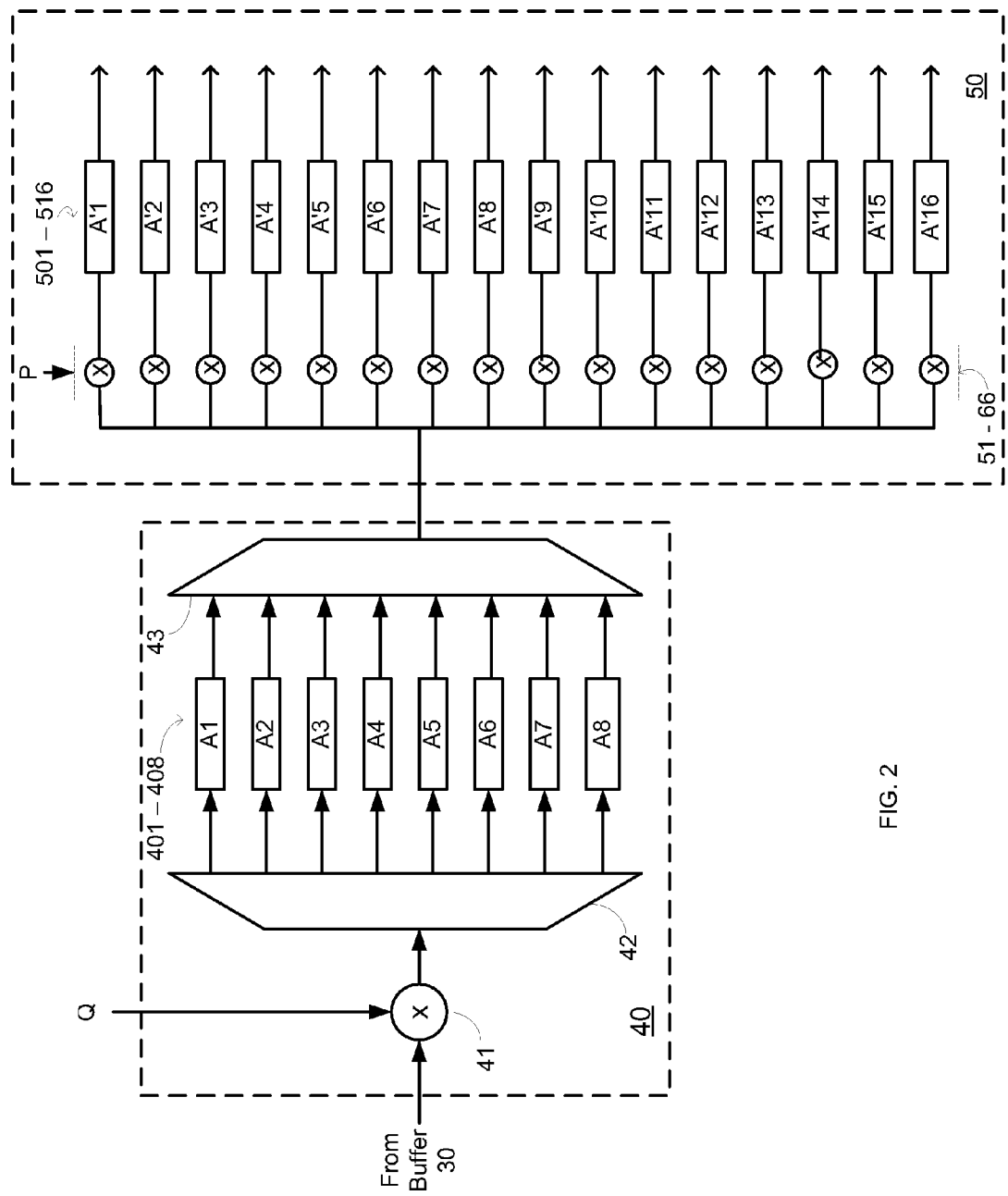
FIG. 2 schematically shows an example of an embodiment of a first filter and a second filter during slot synchronization.

FIG. 2 illustrates schematically shows an example of an embodiment of first filter 40 and second filter 50 during slot synchronization.

First filter 40 receives Q from sequence provider 60 Q while second filter 50 receives P. First filter 40 includes multiplier 41, de-multiplexer 42, multiplexer 43 and eight accumulators A1-A8 401-408.

Eight accumulators A1-A8 are connected between de-multiplexer 42 and multiplexer 43. De-multiplexer 42 sends to one accumulator the output of multiplier 41 while multiplexer 43 selects an accumulator that should output its content (first filter primary result or first filter secondary result) to second filter 50.

Buffer 30 is connected to multiplier 41 of first filter 40 that in turn is connected to accumulators A1-A8 401-408. Each accumulator includes a register (or buffer) and an adder. The adder adds the outcome of multiplier 41 with a previous value of the accumulator.

First filter 40 can include more multipliers in order to speed up the filtering process by parallel multiplications. For example, first filter 40 can include two multipliers that are connected via a multiplexer (not shown) to accumulators A1-A8 401-408.

First filter 40 can include more (or less) accumulators. For example, it can include 16 accumulators and manage subgroups of sixteen samples at a time.

Second filter 50 includes sixteen multipliers 51-66, each connected to an accumulator out of A'1-A'16 501-516. The output of each accumulator is connected to detector 70.

Figure 3:
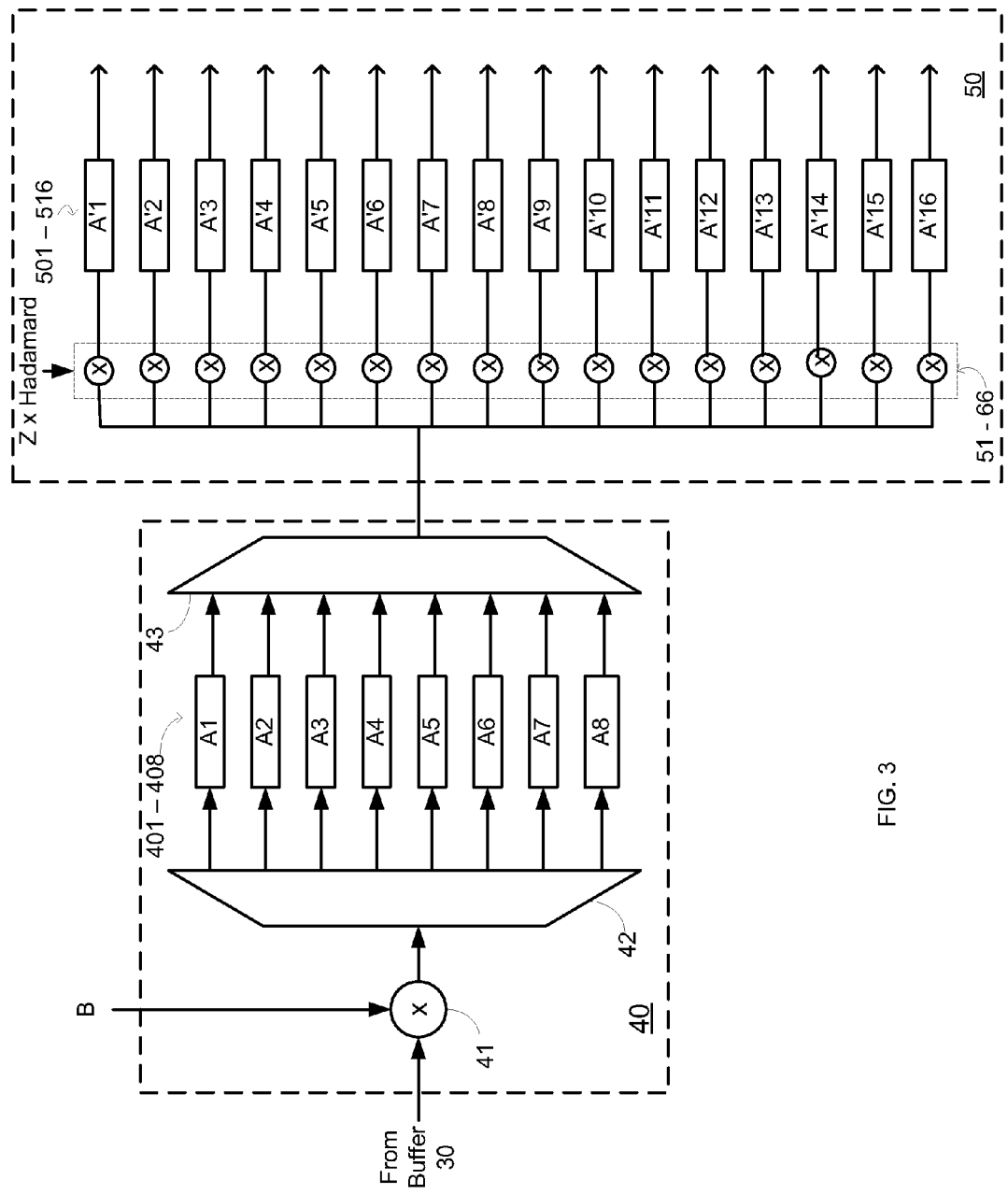
FIG. 3 schematically shows an example of an embodiment of a first filter and a second filter during frame synchronization.

FIG. 3 schematically shows an example of an embodiment of first filter 40 and second filter 50 during frame synchronization.

First filter 40 receives B from sequence provider 60 while second filter 50 receives K (which equals z*Hadamard sequence). During sixteen iterations of the frame synchronization sixteen different K sequences (corresponding to different Hadamard sequences) are fed to second filter 50.

Accordingly, during the frame synchronization and slot synchronization first filter 40 and second filter 50 operate in a similar manner.

According to another embodiment of the invention second filter 50 receives (from sequence provider 60) a sequence that equals B*z*Hadamard sequence while first filter 40 is bypassed.

Figure 4:
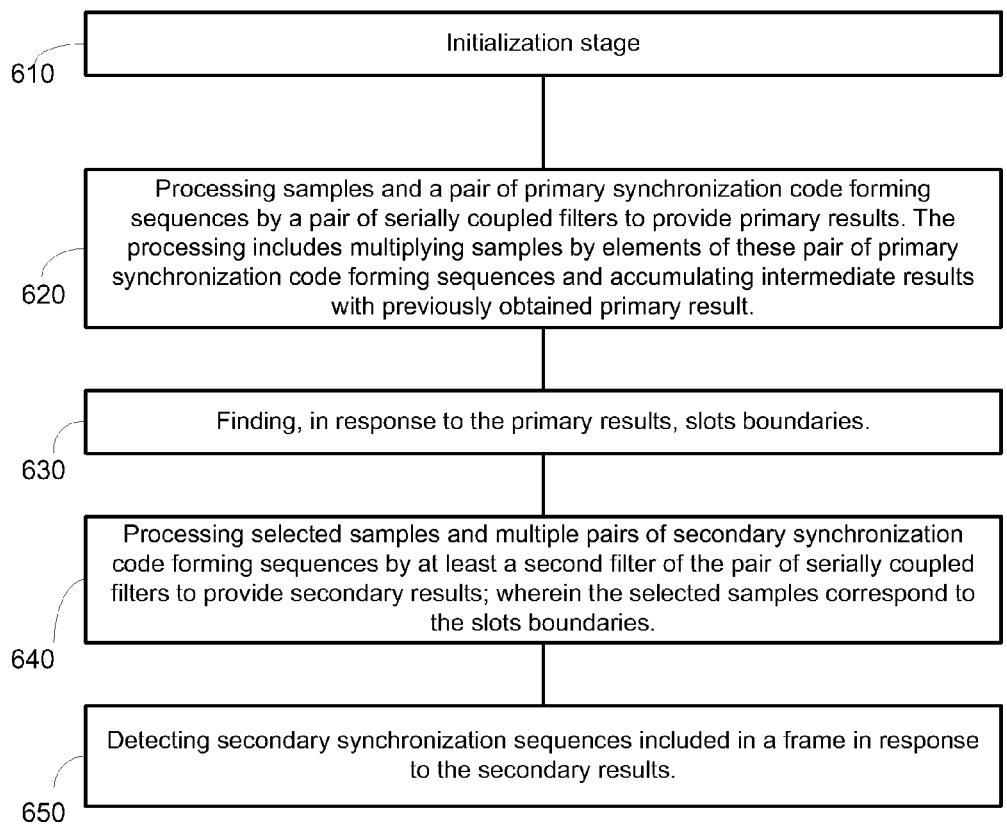
FIG. 4 schematically shows an example of an embodiment of a method.

FIG. 4 schematically shows an example of an embodiment of method 600 for slot and frame synchronization.

Method 600 starts by initialization stage 610.

Initialization stage 610 can include filling a buffer, by a high frequency module such as a radio frequency receiver, with samples and then allowing the high frequency module a low power mode. It can be maintained at this low power mode while the samples are processed and until additional samples may be required.

Stage 610 can include determining a frequency of a clock signal to be provided to a pair of serially connected filters so as to determine the filtering rate of these filters.

Stage 610 is followed by stage 620 of processing samples and a pair of primary synchronization code forming sequences by a pair of serially coupled filters to provide primary results. The processing includes multiplying samples by elements of these pair of primary synchronization code forming sequences and accumulating intermediate results with previously obtained primary result.

Stage 620 is followed by stage 630 of finding, in response to the primary results, slots boundaries. Stage 630 can involve edge detection and other energy (or other parameter) based analysis. Stage 630 is known in the art and required no further explanation.

Stage 630 is followed by stage 640 of processing selected samples and multiple pairs of secondary synchronization code forming sequences by at least a second filter of the pair of serially coupled filters to provide secondary results; wherein the selected samples correspond to the slots boundaries.

Stage 640 can include processing the selected samples by both first and second filters (for example—by multiplying the selected samples by B by the first filter and by multiplying the intermediate results by B*z*Hadamard sequence by the second filter) or by the second filter alone (for example—by multiplying the selected samples, by the second filter by B*z*Hadamard sequence.

Especially, once the slot boundaries are known (as an outcome of the slot synchronization process) the location of the SSC bearing samples is known. These samples can be referred to as the selected samples. The processing can include correlating each possible SSC (out of a group of SSCs) with each SSC bearing samples (of each slot) in order to provide multiple secondary results. Stage 640 can include processing one secondary synchronization sequence after the other.

Stage 640 is followed by stage 650 of detecting secondary synchronization sequences included in a frame in response to the secondary results. This is also known as frame synchronization.

Stage 650 includes determining the sequence of SSCs that are included in the frame. The SSC sequence should match one out of several predefined SSC groups. The SSC group is later used to detect which base station transmitted the samples.

Stage 620 can include multiplying, during a filtering iteration of a first filter, multiple samples of a sub-group of a sample by a same element of a first primary synchronization code forming sequence to provide multiple intermediate results and accumulating, at each accumulator of the first filter, intermediate results obtained during different filtering iterations wherein the intermediate results are associated with samples that are located at a same location in different samples sub groups; wherein the accumulating provides first filter primary results.

Stage 620 can also include multiplying, during a filtering iteration of a second filter, a first filter primary result by a second primary synchronization code forming sequence to provide multiple intermediate results that are sent to multiple accumulators of the second filter; applying a cyclic operation on the second primary synchronization code forming sequence to provide a modified second primary synchronization code forming sequence; and multiplying, during a next filtering iteration of the second filter, another first filter primary result by the modified second primary synchronization code forming sequence to provide multiple intermediate results that are sent to the multiple accumulators of the second filter.

The cyclic operation implements a sliding window that virtually scans the samples one after the other.

Stage 620-650 can be executed at a first rate that exceeds a sample rate.

Stage 620-650 can be followed by processing other samples. Samples can be processed one group after another and even one frame after the other. A frame and even a slot can include multiple groups of samples. The other samples can belong to another frame. Multiple repetitions of stages 620-650 can process samples of various frames in a pipelined manner.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

In addition, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device.

However, other modifications, variations, and alternatives are also possible. The specifications and drawings are, accordingly, to be regarded in an illustrative rather than in a restrictive sense.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A slot and frame synchronization method in a wireless system, the method comprising:
   processing samples and a pair of primary synchronization code forming sequences by a pair of serially coupled filters to provide primary results;
   finding, in response to the primary results, slots boundaries;
   processing selected samples and multiple pairs of secondary synchronization code forming sequences by at least a second filter of the pair of serially coupled filters to provide secondary results; wherein the selected samples correspond to the slots boundaries; and
   detecting secondary synchronization sequences included in a frame in response to the secondary results.

2. The method according to claim 1 comprising:
   filling a buffer with the samples by a high frequency module;
   changing an operational mode of the high frequency module to a low power mode;
   retrieving samples from the buffer and processing the samples while the high frequency module is in the low power mode.

3. The method according to claim 1 comprising:
   multiplying, during a filtering iteration of a first filter, multiple samples of a sub-group of a sample by a same element of a first primary synchronization code forming sequence to provide multiple intermediate results; and
   accumulating, at each accumulator of the first filter, intermediate results obtained during different filtering iterations wherein the intermediate results are associated with samples that are located at a same location in different samples sub groups; wherein the accumulating provides first filter primary results.

4. The method according to claim 1 comprising:
multiplying, during a filtering iteration of the second filter, a first filter primary result by a second primary synchronization code forming sequence to provide multiple intermediate results that are sent to multiple accumulators of the second filter;
applying a cyclic operation on the second primary synchronization code forming sequence to provide a modified second primary synchronization code forming sequence; and
multiplying, during a next filtering iteration of the second filter, another first filter primary result by the modified second primary synchronization code forming sequence to provide multiple intermediate results that are sent to the multiple accumulators of the second filter.

5. The method according to claim 1 comprising processing the samples and the pair of primary synchronization code forming sequences at a first rate that exceeds a sample rate.

6. The method according to claim 1 comprising processing, in a serial manner, one group of samples after the other.

7. The method according to claim 1 comprising processing one pair of secondary synchronization code forming sequence after the other.

8. The method according to claim 1 comprising processing the selected samples and the multiple pairs of secondary synchronization code forming sequences by a first filter and the second filter of the pair of serially coupled filters to provide secondary results.

9. A device having slot and frame synchronization capabilities, the device comprises:
a buffer, adapted to store samples;
a first and second filters that form a pair of serially coupled filters that is configured to:
process samples and a pair of primary synchronization code forming sequences to provide primary results;
process selected samples and multiple pairs of secondary synchronization code forming sequences to provide secondary results;
wherein the selected samples correspond to the slots boundaries;
a boundary detection circuit that is configured to:
find slots boundaries in response to the primary results; and
detect secondary synchronization sequences included in a frame in response to the secondary results.

10. The device according to claim 9 comprising a high frequency module that fills the buffer with samples; wherein the high frequency module enters a low power mode after filling the buffer; wherein the pair of serially coupled filters retrieves samples from the buffer and process the samples while the high frequency module is in the low power mode.

11. The device according to claim 9 wherein the first filter comprises at least one multiplier and multiple first filter accumulators;
wherein the first filter is configured to multiply, during a filtering iteration of the first filter, multiple samples of a sub-group of a sample by a same element of a first primary synchronization code forming sequence to provide multiple intermediate results; and
accumulate, at each accumulator of the first filter, intermediate results obtained during different filtering iterations wherein the intermediate results are associated with samples that are located at a same location in different samples sub groups;
wherein the accumulating provides first filter primary results.

12. The device according to claim 9 wherein the second filter comprises multiple multipliers and multiple second filter accumulators; wherein the second filter is configured to: multiply, during a filtering iteration of a second filter, a first filter primary result by a second primary synchronization code forming sequence to provide multiple intermediate results that are sent to multiple accumulators of the second filter; receive a modifier second primary synchronization code that is modified by applying a cyclic operation on the second primary synchronization code forming sequence; and multiply, during a next filtering iteration of the second filter, another first filter primary result by the modified second primary synchronization code forming sequence to provide multiple intermediate results that are sent to the multiple accumulators of the second filter.

13. The device according to claim 9 wherein the pair of serially coupled filters operate, when processing the samples and the pair of primary synchronization code forming sequences, at a first rate that exceeds a sample rate.

14. The device according to claim 9 wherein the pair of serially coupled filters process, in a serial manner, one group of samples after the other.

15. The device according to claim 9 wherein the pair of serially coupled filters process one pair of secondary synchronization code forming sequence after the other.

* * * * *